US009228646B2

(12) United States Patent
Geppert et al.

(10) Patent No.: US 9,228,646 B2
(45) Date of Patent: Jan. 5, 2016

(54) ELECTROMECHANICAL LINEAR DRIVE HAVING A RELUBRICATING DEVICE

(75) Inventors: Andreas Geppert, Lahr (DE); Jochen Kullick, Offenburg (DE)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/821,776

(22) PCT Filed: Oct. 21, 2011

(86) PCT No.: PCT/EP2011/068470
§ 371 (c)(1),
(2), (4) Date: Sep. 26, 2013

(87) PCT Pub. No.: WO2012/045891
PCT Pub. Date: Apr. 12, 2012

(65) Prior Publication Data
US 2014/0007719 A1    Jan. 9, 2014

(30) Foreign Application Priority Data

Sep. 9, 2010    (DE) .......................... 10 2010 044 793

(51) Int. Cl.
*F16H 25/12*   (2006.01)
*E05B 17/00*   (2006.01)
(Continued)

(52) U.S. Cl.
CPC ............ *F16H 25/12* (2013.01); *E05B 17/0025* (2013.01); *E05B 41/00* (2013.01);
(Continued)

(58) Field of Classification Search
CPC ......... F16H 57/04; F16H 25/24; F16H 25/22; F16H 25/2204; F16H 25/20; F16H 57/0497; F16N 1/00; B05D 1/28; B63H 9/08; B08B 15/00; E05B 41/00; E05B 17/00; E05C 3/04; E05C 5/04

USPC ........ 74/89, 89.23, 89.34, 89.37, 89.4, 89.44; 184/5, 7.1, 9, 100
See application file for complete search history.

(56) References Cited

U.S. PATENT DOCUMENTS 5,454,278 A * 10/1995 Kasuga ........................ 74/89.33
5,761,960 A *  6/1998 Nagai et al. .................. 74/89.33
(Continued)

FOREIGN PATENT DOCUMENTS

| DE | 43 40 078 A1 | 7/1994 |
| EP | 1647740 A1 | 4/2006 |
| EP | 2251567 A1 | 11/2010 |

OTHER PUBLICATIONS

International Search Report corresponding to corresponding Patent Application No. PCT/EP2011/068470 dated Jan. 25, 2012.

*Primary Examiner* — William C Joyce
*Assistant Examiner* — Jude Agendia
(74) *Attorney, Agent, or Firm* — Renner, Otto, Boisselle & Sklar, LLP

(57) ABSTRACT

An electromechanical linear drive having a housing and a piston rod that passes through a housing end cover, and is carried by a spindle nut arranged longitudinally displaceably in a housing interior space. The spindle nut engages the motor-driven threaded spindle such that it is displaceable back and forth in the housing interior space by rotary motion of the spindle. A lubrication nipple is accessible on an outer side of the housing, and at least one lubrication passage extends from the nipple and opens to a stop surface located in the housing interior space, which stop surface forms an end stop for motion of the spindle nut. At least one lubrication conduit leads to lubrication sites of the spindle nut and is arranged in the spindle nut so that when the spindle nut is in abutment against the stop surface, the lubrication conduit is joined to the housing-side lubrication passage.

7 Claims, 3 Drawing Sheets

Figure 1:
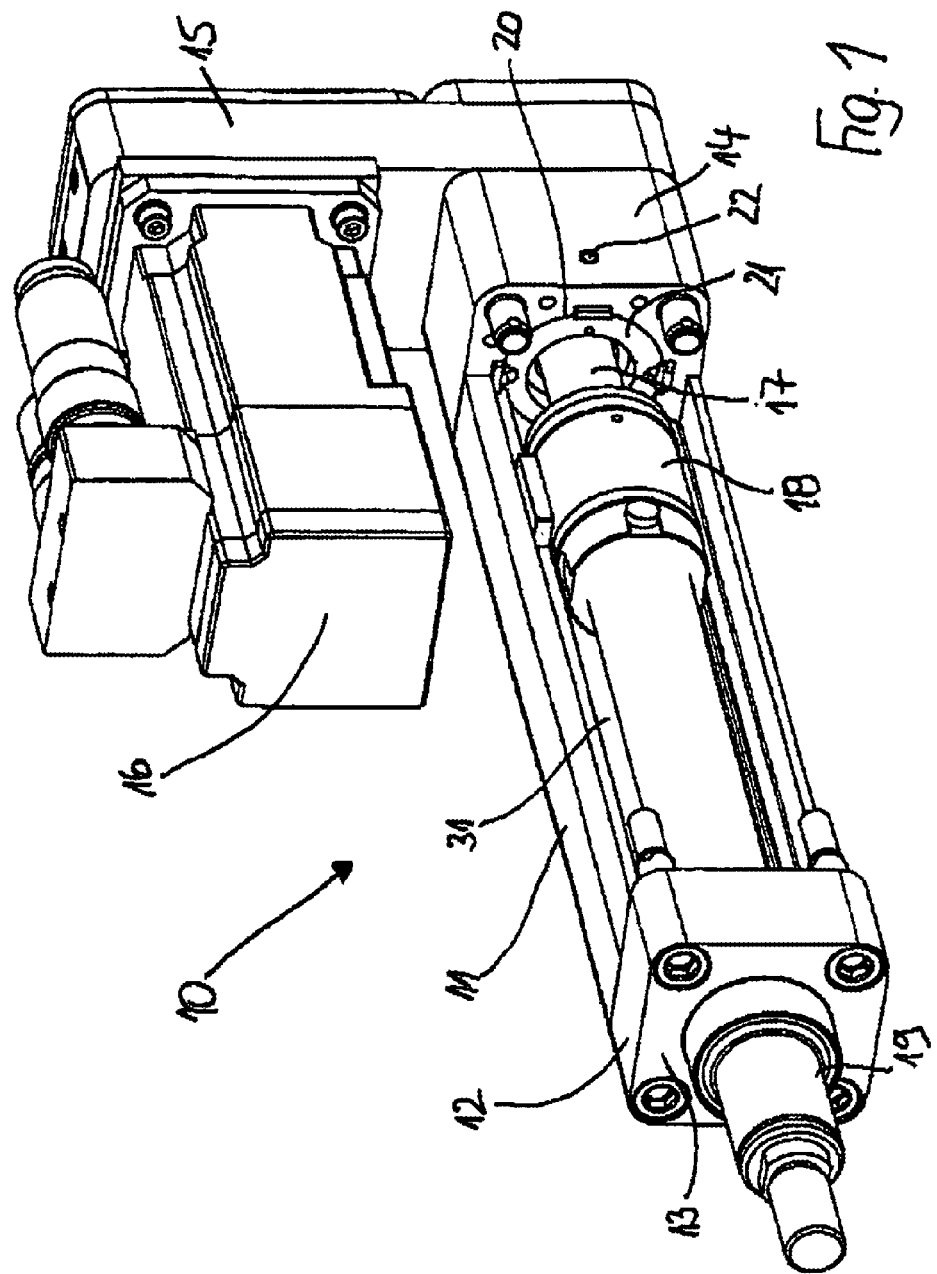

(51) Int. Cl.

| | | |
|---|---|---|
| *E05B 41/00* | (2006.01) | |
| *E05C 3/04* | (2006.01) | |
| *E05C 5/04* | (2006.01) | |
| *F16C 19/54* | (2006.01) | |
| *F16C 33/66* | (2006.01) | |
| *F16H 25/20* | (2006.01) | |
| *F16H 57/04* | (2010.01) | |
| *F16N 1/00* | (2006.01) | |
| *F16H 25/22* | (2006.01) | |

(52) U.S. Cl.
CPC .................. *E05C 3/042* (2013.01); *E05C 5/04* (2013.01); *F16C 19/548* (2013.01); *F16C 33/66* (2013.01); *F16H 25/2015* (2013.01); *F16H 57/0464* (2013.01); *F16H 57/0497* (2013.01); *F16N 1/00* (2013.01); *F16H 25/2204* (2013.01); *F16H 2025/2081* (2013.01); *Y10T 74/18744* (2015.01)

(56) References Cited

U.S. PATENT DOCUMENTS

| | | | | |
|---|---|---|---|---|
| 6,125,968 | A  * | 10/2000 | Shirai | 184/5 |
| 6,240,796 | B1 * | 6/2001  | Yamada | 74/89.23 |
| 6,364,058 | B1 * | 4/2002  | Nishide et al. | 184/5 |
| 6,756,707 | B2 * | 6/2004  | Hochhalter et al. | 310/20 |
| 7,141,752 | B2 * | 11/2006 | Hochhalter et al. | 219/86.25 |
| 7,448,134 | B2 * | 11/2008 | Nagai et al. | 29/898.03 |
| 7,543,514 | B2 * | 6/2009  | Hwang et al. | 74/89.44 |
| 8,196,484 | B2 * | 6/2012  | Holker et al. | 74/89.44 |
| 8,302,499 | B2 * | 11/2012 | Chen et al. | 74/89.44 |
| 2001/0015581 | A1 * | 8/2001 | Sato et al. | 310/12 |
| 2003/0164264 | A1 * | 9/2003 | Luo | 184/5 |

* cited by examiner

ELECTROMECHANICAL LINEAR DRIVE HAVING A RELUBRICATING DEVICE

The invention relates to an electromechanical linear drive having a housing and having at least one spindle nut that is situated in a housing interior in a longitudinally movable manner as the carrier of a functional part that is attached thereto, wherein the spindle nut sits on a threaded spindle that extends through the housing interior and may be set in rotary motion by means of a drive, and is movable back and forth in the housing interior by the rotary motion of the threaded spindle.

An electromechanical linear drive for generating translatory feed motions having the aforementioned features is known from DE 10 20 663 A1, the functional part carried by the spindle nut comprising at least one piston rod that extends through an end cover of the housing and protrudes from the housing on one side. To the extent that the corresponding feed motion is brought about by the displacement of a spindle nut along a threaded spindle, and inasmuch as lubrication, preferably grease lubrication, must be set up for the motion of the spindle nut along the threaded spindle, the spindle nut has a lubricating path formed in it which leads into a lubricating nipple formed on the outer circumference of the spindle nut. A lubrication adapter accessible from outside is attached to the housing that encloses the spindle nut. To perform the lubrication process, the lubricating nipple of the spindle nut and the lubrication adapter fixed on the housing must therefore both be brought into alignment with each other. Disadvantageously, this necessitates additional effort and expense, and also stands in the way of automatically performable relubrication.

Furthermore, JP 11287305 A describes a linear drive having a recirculating ball screw and a recirculating ball nut, there being on the one hand a lubricating line formed in the spindle nut and in the associated base a lubricating nipple formed having a lubricant path connecting to the lubricating nipple and leading into a contact surface to the spindle nut, the lubricating line of the spindle nut being connected to the lubricating path on the base. No movement of the spindle nut relative to the base is intended, so that the lubrication connection, once established, is constantly maintained.

The object of the invention is to set up an electromechanical linear drive of the type named at the beginning in such a way that relubrication of the spindle nut is simplified, and therefore the possibilities of an automatically working relubrication system are usable.

The fulfillment of this object derives from claim 1; advantageous forms and refinements of the invention are specified in the subordinate claims.

The invention provides in its basic concept that a lubricating nipple that is accessible on the outer surface of the housing, and at least one lubricating path connecting thereto and leading into a stop face for the spindle nut located in the housing interior, are situated in a region of the housing that forms an end stop for the motion of the spindle nut, and that at least one lubricating line leading to the lubricating points of the spindle nut is situated in the spindle nut, in such a way that when the spindle nut fits tightly against the stop face of the housing the lubricating line is connected to the lubricating path on the housing.

The first advantage connected with the invention is that the spindle nut for the relubrication must be moved to a position defined by the stop face, in which there is automatically a connection between the lubricating line formed in the spindle nut and the lubricating path on the housing. Since the lubrication aperture is no longer situated in the region of the housing traversed by the spindle nut as it moves, but rather in an end region of the housing, there is no longer any need to provide a special closure for the lubricating nipple provided according to the invention. In the corresponding position of the spindle nut on the stop face, first of all lubricating grease can be introduced manually by pressing it into the lubricating nipple, which however already reduces the cost and effort of relubrication.

However, one exemplary embodiment of the invention also includes the provision that an automatically working lubricating device is connectible to the lubricating nipple situated in the housing region. In this way, the entire sequence of the relubrication process can be brought into one coherent interrelation and controlled, by moving the spindle nut into its end position in contact with the stop face and pressing the lubricating grease through the lubricating nipple into the lubricating path of the housing region, and thereby also into the lubricating line of the spindle nut. That also opens up the possibility of specifying the relubrication cycles in an expedient manner. Thus, after a certain number of strokes of the spindle nut the spindle nut can be moved automatically to its assigned end position and an automatically working relubrication device connected to the lubricant can be activated, or a time interval for the individual lubrication processes can be specified in an assigned controller.

According to one exemplary embodiment of the invention, it can be provided that the stop face for the spindle nut is formed on a separate buffer plate inserted into the housing on a face of the housing interior space which accommodates the spindle nut, and that a connecting hole is situated in the buffer plate to connect the lubricating path formed in the housing region with the lubricating line formed in the spindle nut.

The invention can be realized in an advantageous manner in the design of a linear drive described in the species-defining DE 10 2004 058 935 A1, wherein the functional part carried by the spindle nut comprises at least one piston rod that extends through an end cover of the housing and protrudes from the housing on one side.

One embodiment of the invention provides that the lubricating nipple is situated in the housing region lying opposite the housing cover that receives the piston rod. Depending on the use and design of the electromechanical linear drive, it is also possible however to situate the relubricating device in the housing region which has the end cover of the housing that receives the piston rod.

In an alternative embodiment of the invention, it can be provided that the functional part carried by the spindle nut comprises a traveler which is movable on an outer surface of the housing, which is connected to the spindle nut by means of a web that extends into the interior of the housing.

In this case, the detail can be provided that the housing comprising a tubular housing profile is closed at its two ends by a flange fastened to the end faces of the housing profile, and the lubricating nipple and the lubricating path which leads to the stop face for the spindle nut are formed in one of the two flanges.

Figure 2:
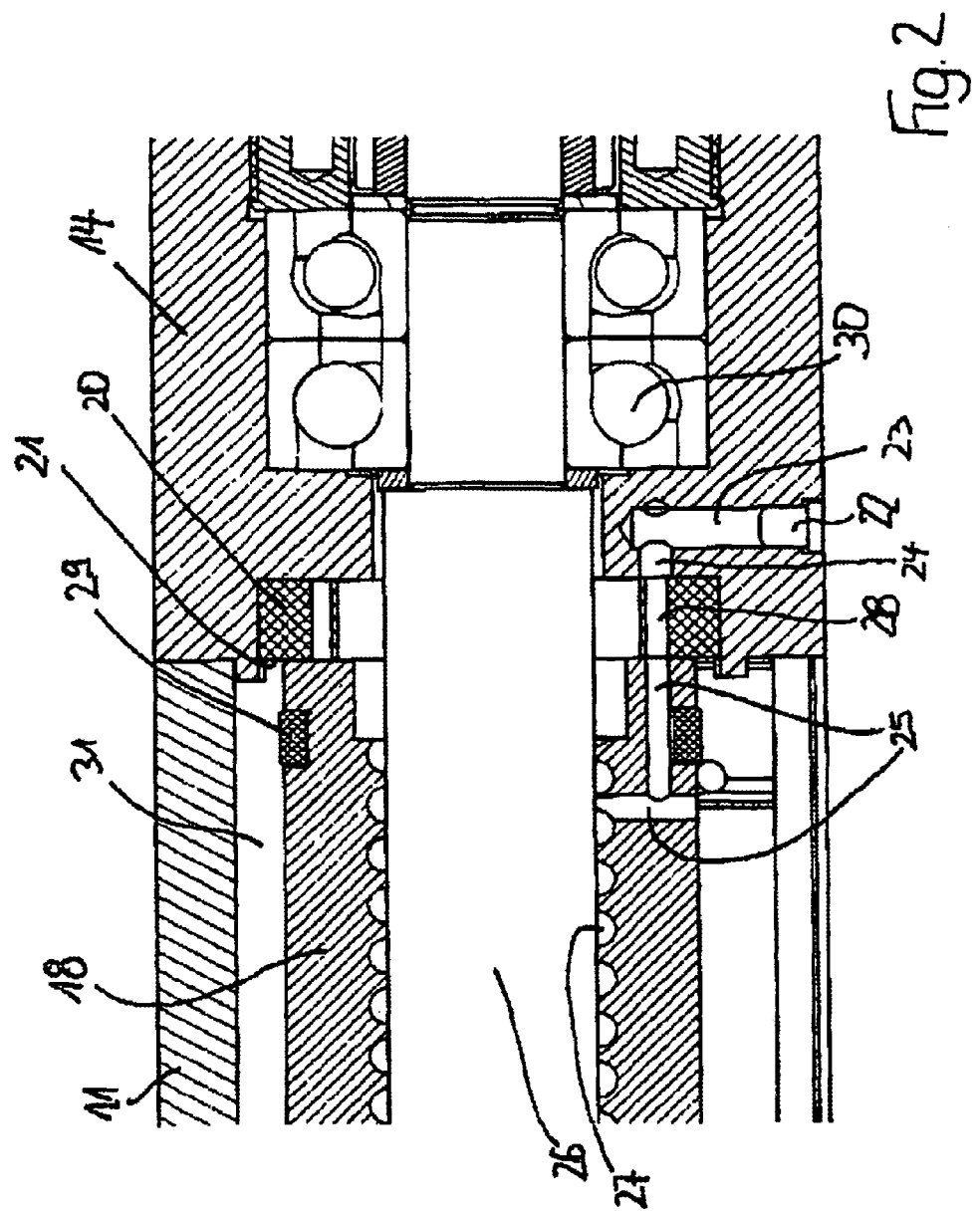
Figure 3:
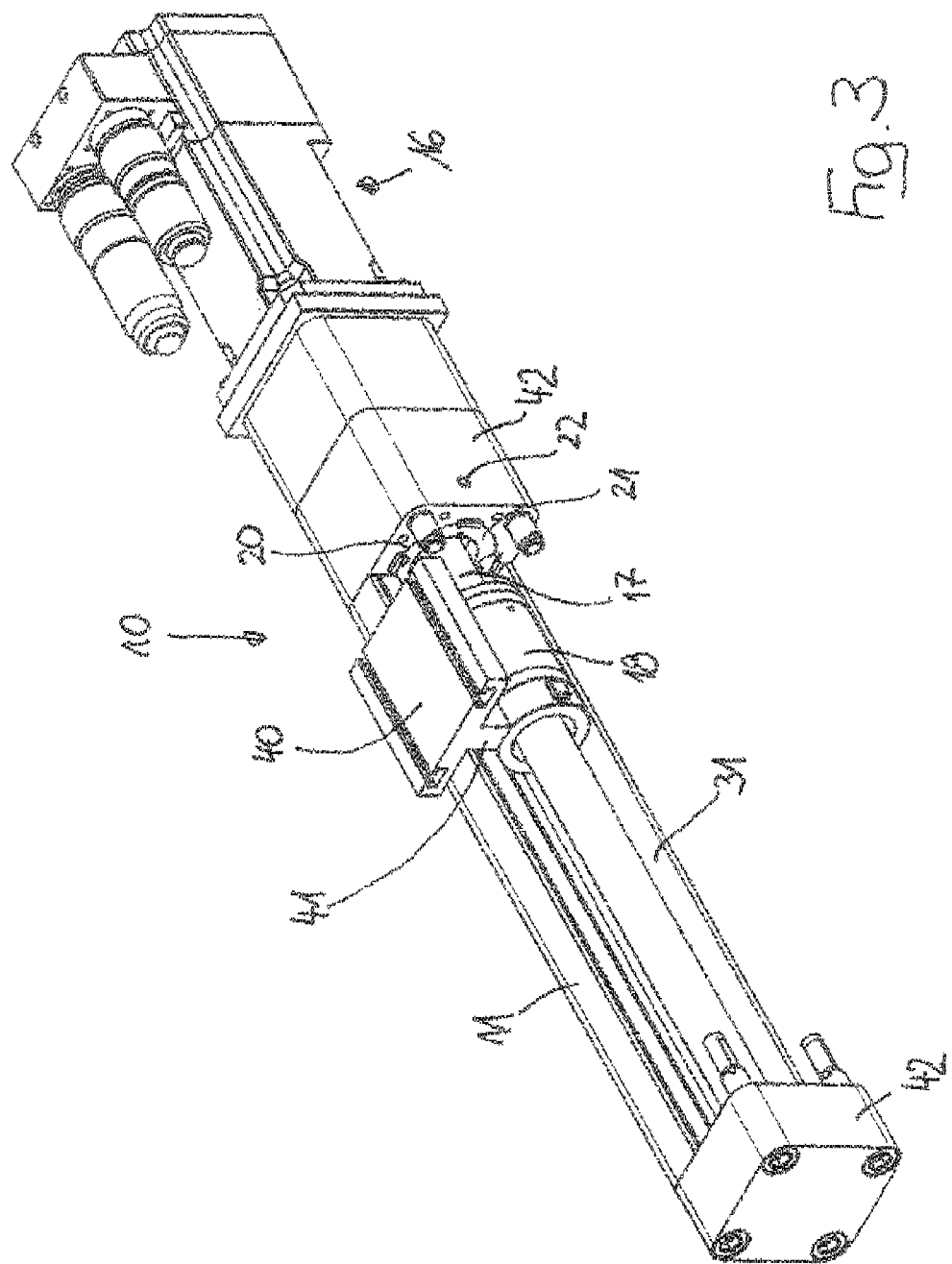

The drawing illustrates exemplary embodiments of the invention which are described below. The figures show the following:

FIG. 1 an electromechanical linear drive having a piston rod situated on one side of a spindle nut, in a perspective view with the housing interior open, FIG. 2 the relubricating device of the electromechanical linear drive in an enlarged sectional view from FIG. 1, FIG. 3 a different embodiment of a linear drive, having a traveler which is fastened to the spindle nut and is movable on an outer surface of the housing, in a depiction corresponding to FIG. 1.

The linear drive 10 shown in FIG. 1 has an elongated housing 11, on one side (the left) of which is situated a housing region 12 with a housing cover 13 situated therein. On the opposite side of the housing cover 13 is a housing region 14 with a transmission housing 15 positioned thereon, to which an electric motor 16 is flange-connected in an arrangement parallel to the elongated housing 11. By means of the electric motor 16 and the transmission situated in the transmission housing 15, a threaded spindle 17 lying in the housing interior 31 of the elongated housing 11 is driven and set into rotation, on which threaded spindle sits a spindle nut 18 that encircles the threaded spindle 17, which spindle nut is moved back and forth in the housing interior 31 by the rotation of the threaded spindle 17. On its side facing the housing region 12 having the housing cover 13, the spindle nut 18 carries a piston rod 19 which extends through the housing cover 13, and which applies force for example with its outer end to a mass or object and moves it. In the housing region 14 connected to the transmission housing 15, on the face of the housing interior 31 that receives the spindle nut 18, a buffer plate 20 is inserted, which forms a stop face 21 for the motion of the spindle nut 18. The lubricating nipple 22 employed in the housing region 14 for performing relubrication processes is already recognizable from FIG. 1.

As can be seen in greater detail from FIG. 2, the lubricating nipple 22 is inserted in a drilled hole 23 that runs radially in the housing region 14, at the end of which the lubricating channel 24 oriented axially to the housing interior 31 is connected, so that a corresponding lubricating path 23, 24 is formed in the housing region 14.

The threaded spindle 17 for its part has an axial lubricating line 25 starting from its end which faces the buffer plate 20, which leads into a lubricating line section 25 that runs radially. In the depiction in FIG. 2, the threaded spindle 17 encircled by the spindle nut 18 is shown not in sectional view, but merely schematically as a round body. Moreover, ball holders 27 are formed on the inner wall of the spindle nut 18 which encircles the threaded spindle, into which individual balls are inserted that work with the threading of the threaded spindle to form the recirculating ball screw portion, which needs relubrication. It can be seen that the lubricating line 25 of the spindle nut 18 and the lubricating channel 24 of the housing region 14 are connected to each other via a connecting hole 28 which penetrates the buffer plate that forms the stop face 21. It is also evident from FIG. 2 that the spindle nut 18 has an outer sliding ring 29 in its end region, and that ball bearings 30 are situated in the housing region 14 to support the threaded spindle 17, which can be set into rotation.

It can be seen from FIG. 2 that the relubrication can be performed when the spindle nut 18 is in contact with the stop face 21 of the buffer plate 20, because the axial lubricating line 25 of the spindle nut 18 is then axially aligned with the connecting hole 28 in the buffer plate 20 and also with the lubricating channel 24 of the housing region 14, so that lubricating grease can be inserted all the way into the ball holders 27 of the threaded spindle 17 by way of the lubricating nipple 22 and the drilled hole 23. If an automatically working lubricating device that is coupled with the lubricating nipple 22 is connected to the housing region 14, then the relubricating process can be automated, by moving the spindle nut 18 to its end position on the stop face 21 by means of an appropriately set up controller, and then releasing the lubricating grease supply.

The exemplary embodiment depicted in FIG. 3 differs from the previously described exemplary embodiment only in that instead of the piston rod attached to the spindle nut 18 as a functional part in the exemplary embodiment depicted in FIG. 1, now a traveler 40 that is movable on an outer surface of the housing 11 is provided, which is connected to the spindle nut 18 by means of a web 41 which extends into the housing interior 31 and is connected therewith the spindle nut 18 in the exemplary embodiment depicted in FIG. 3. Such a construction of a linear drive is likewise known in the prior art, where it can be provided for example that the wall of the housing 11 adjacent to the traveler 40 has a slit through which the web 41 extends into the housing interior 51, the web 41 being movable in the slit. The particular region of the slit not covered by the web can be closed in a known manner by an accompanying moving covering. In such a case, the two end faces of the housing 11 comprising for example a tubular housing profile are closed by flanges 42 fastened to the ends of the housing profile. As can be seen from FIG. 3 without further explanation, each of the two flanges 42 is suitable for receiving the relubricating device, as illustrated here by the arrangement of the lubricating nipple 22 in the right flange 42 in the depiction in FIG. 3. In addition, the two flanges 42 can be called upon to support the threaded spindle 17. Furthermore, in a modification of the depiction in FIG. 1, in the exemplary embodiment depicted in FIG. 3 the drive 16 for the threaded spindle 17 is situated in a line or aligned with the housing 11 and the threaded spindle 17, which however has no influence on the form of the invention.

The features of the object of these documents disclosed in the above description, the claims, the abstract and the drawing can be essential, both individually and in any combination, for the realization of the invention in its various embodiments.

The invention claimed is:

1. An electromechanical linear drive comprising:
a housing;
at least one spindle nut situated in an interior of the housing in a longitudinally movable manner as a carrier of a functional part that is attached the spindle nut, wherein the spindle nut threadedly engages a threaded spindle that extends through the interior of the housing and may be set in rotary motion by means of a drive, and wherein the spindle nut is movable back and forth in the interior of the housing by the rotary motion of the threaded spindle;
a lubricating nipple that is accessible on the outer surface of the housing;
at least one lubricating path extending from the lubricating nipple to an axially facing stop face in the housing, the axially facing stop face forming an end stop for motion of the spindle nut, and the at least one lubricating path opening to the axially facing stop face; and
at least one lubricating line in the spindle nut that leads at least one lubricating point of the spindle nut, the lubricating line opening to an end face of the spindle nut that axially faces the axially facing stop face and abuts the axially facing stop face when the spindle nut is engaged with the end stop, and when the end face of the spindle nut fits tightly against the axially facing stop face in the housing the at least one lubricating line in the spindle nut is connected to the at least one lubricating path in the housing.

2. The electromechanical linear drive according to claim 1, wherein the axially facing stop face is formed on a separate buffer plate inserted into the housing on a face of the housing interior space which accommodates the spindle nut, and that a connecting hole in the buffer plate forms part of the lubricating path in the housing.

3. The electromechanical linear drive according to claim 1, wherein an automatically working lubricating device is connected to the lubricating nipple.

4. The electromechanical linear drive according to claim 1, further comprising the functional part and the functional part comprises at least one piston rod that extends through an end cover of the housing and protrudes from the housing on one side.

5. The electromechanical linear drive according to claim 4, wherein the lubricating nipple is situated in a region of the housing that lies opposite the end cover from which the piston rod protrudes.

6. The electromechanical linear drive according to claim 1, further comprising the functional part and wherein the functional part comprises a traveler which is movable on an outer surface of the housing, and the travelor is connected to the spindle nut by means of a web which extends into the housing interior.

7. The electromechanical linear drive according to claim 6, wherein the housing has a tubular housing profile that is closed at opposite ends by respective flanges fastened to end faces of the tubular housing profile, and the lubricating nipple and the lubricating path which leads to the stop face for the spindle nut are formed in one of the flanges.

\* \* \* \* \*